UNITED STATES PATENT OFFICE.

ROBERT JAMES ADAMS, OF REPUBLIC, KANSAS.

GRAINING COMPOUND.

SPECIFICATION forming part of Letters Patent No. 369,220, dated August 30, 1887.

Application filed May 3, 1887. Serial No. 237,002. (No specimens.)

*To all whom it may concern:*

Be it known that I, ROBERT JAMES ADAMS, a citizen of the United States, residing at Republic, in the county of Republic and State of Kansas, have invented a new and useful Improvement in Compounds, of which the following is a specification.

My invention relates to a graining compound consisting of the following ingredients, combined in the proportions stated, viz: gum-senegal, two and one-half ounces; bone-glue, two drams; dextrine, three and one-half ounces; white cane-sugar, one and one-half ounce; rain or other soft water, eight ounces; acetic acid, (dilute,) twenty ounces; acetic acid, (full strength,) two ounces.

Place the gum-senegal in six ounces of the water and set aside for twenty-four hours, or until a mucilage is formed. Place the glue in the remaining two ounces of water and allow the same to soak until soft. Then heat slowly to thin and add the strong acetic acid. Place the dextrine and sugar in the dilute acetic acid and shake until thoroughly dissolved. When all of the said parts are prepared in the manner described, place them together and mix thoroughly and the result will be the compound desired.

The manner of using the compound is as follows: Moisten any of the powdered colors used in distemper graining or painting—such as umber, ocher, Vandyke brown, or any other vegetable or mineral colors—with the compound and apply with a rag or brush to the surface to be decorated, and, while the same is still wet, go over it with the grain-combs or other tools used by painters and grainers to produce the desired design. After the surface has been prepared in the desired manner the paint should be allowed to dry, (this requiring about twenty-four hours,) after which a coat of varnish, or oil and varnish, should be applied.

Should it be desired to have the preparation dry very rapidly, I use an egg drier, comprising a tea-spoonful of sugar, one or two ounces of water, and a hen's egg, mixed thoroughly together and sprinkled on the brush or rag used to apply the paint.

I claim—

The herein-described graining compound, composed of gum-senegal, bone-glue, dextrine, sugar, water, and acetic acid, combined in the proportions substantially as specified.

In testimony that I claim the foregoing as my own I have hereto affixed my signature in presence of two witnesses.

ROBERT JAMES ADAMS.

Witnesses:
ISAAC W. WILLIAMS,
GEORGE M. DYE.